W. G. SAVAGE.
Wheel Cultivator.
No. 48,102. Patented June 6, 1865.
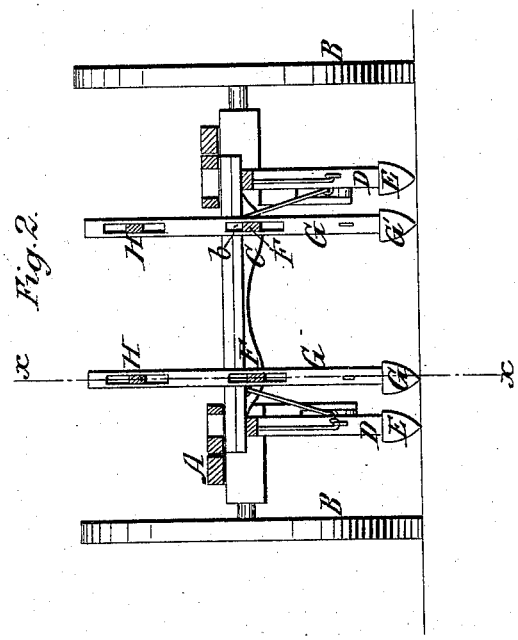
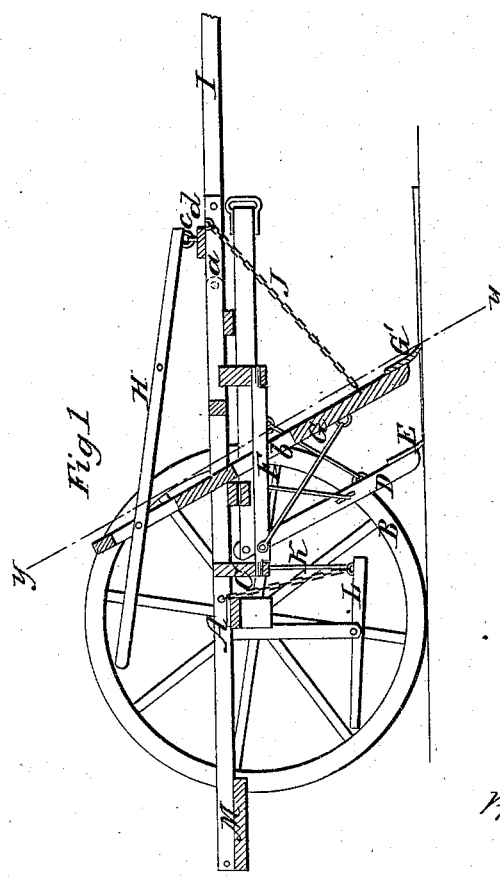
Witnesses
Theo. Tusch
Wm Trewin
Inventor
W. G. Savage.
By Munn & Co
Attys.

UNITED STATES PATENT OFFICE.

WILLIAM G. SAVAGE, OF CLINTON, ILLINOIS.

IMPROVEMENT IN CULTIVATORS.

Specification forming part of Letters Patent No. 48,102, dated June 6, 1865.

*To all whom it may concern:*

Be it known that I, WILLIAM G. SAVAGE, of Clinton, in the county of De Witt and State of Illinois, have invented a new and Improved Cultivator or Corn-Plow; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line $x\, x$, Fig. 2; Fig. 2, a front sectional view of the same, taken in the line $y\, y$, Fig. 1.

Similar letters of reference indicate like parts.

This invention relates to a new and improved cultivator or corn-plow; and it consists in a novel arrangement of the plows, substantially as hereinafter set forth, whereby the driver will have full or complete control over the same, and at the same time a very simple and efficient implement for the purpose specified obtained.

A represents the main frame of the machine, which is mounted on two wheels, B B; and C is a frame which is fitted within the frame A, and is hung on pivots $a$ at the front part of the frame A. The frame C has two plow-standards, D D, attached to it, said standards being slightly inclined and having plows E secured to their lower parts.

F F represent two shafts of rectangular form, which are placed longitudinally in the frame C, and are allowed to turn freely in their bearings; and G G are two inclined standards, which are slotted longitudinally, as shown at $b$, and have the shafts F passing through said slots. The standards G G have plows G' at their lower ends.

H H represent levers, the front ends of which are attached by joints $c$ to a cross-bar, $d$, at the rear of the draft-pole I, the latter being attached to the frame C. The plow-standards G G are braced at their lower parts from the ends of the cross-bar $d$ by chains J.

At the rear of the frame C there are two pendent rods, K K, which are connected at their lower ends to treadles L L, which are within reach of the device on the seat M, which is at the rear of frame A.

By means of the treadles L the frame C may be raised so that the plows may be elevated free from the ground, when necessary, and by operating the levers H H the plows of the standards G G may be moved laterally, so that they may conform to the sinuosities of the rows of plants, and by means of said levers the plows may be raised independently of the raising of the frame C. Thus by this simple means the driver will have full control over the implement and can cause the earth to be plowed as near to the rows of plants as may be desired.

I claim as new and desire to secure by Letters Patent—

1. The arrangement of the plow-standards G G, shafts F F, and levers H H, placed within the frame C, which is pivoted within the mounted frame A, substantially as and for the purpose herein set forth.

2. The connecting of the frame C to treadles L L in the manner substantially as and for the purpose specified.

3. The combination of the two frames A C with the plow-standards, treadles, and levers, all arranged to operate in the manner substantially as and for the purpose set forth.

WILLIAM G. SAVAGE.

Witnesses:
WM. CLAGG,
A. H. C. BARBER.